US009065528B2

(12) United States Patent
Frenger et al.

(10) Patent No.: US 9,065,528 B2
(45) Date of Patent: Jun. 23, 2015

(54) INSERTION OF SIGNALS BY AN INTERMEDIATE DEVICE

(75) Inventors: Pål Frenger, Linköping (SE); Peter Larsson, Solna (SE); Niklas Johannson, Sollentuna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 568 days.

(21) Appl. No.: 13/003,305

(22) PCT Filed: Jul. 10, 2008

(86) PCT No.: PCT/EP2008/059014
§ 371 (c)(1), (2), (4) Date: Jan. 9, 2011

(87) PCT Pub. No.: WO2010/003461
PCT Pub. Date: Jan. 14, 2010

(65) Prior Publication Data

US 2011/0164661 A1 Jul. 7, 2011

(51) Int. Cl.

| | |
|---|---|
| ***H04B 7/14*** | (2006.01) |
| ***H04B 7/155*** | (2006.01) |
| ***H04W 28/02*** | (2009.01) |
| *H04L 5/00* | (2006.01) |

(52) U.S. Cl.
CPC ......... *H04B 7/15542* (2013.01); *H04W 28/021* (2013.01); *H04L 5/0007* (2013.01); *H04L 5/0023* (2013.01); *H04L 5/0037* (2013.01); *H04L 5/0048* (2013.01); *H04L 5/0053* (2013.01)

(58) Field of Classification Search
CPC ..... H04W 84/18; H04W 84/47; H04W 4/005; H04W 28/021; H04W 56/001; H04L 5/007; H04L 5/0023; H04L 5/0037; H04L 5/0048; H04L 5/0053; H04B 7/15542
USPC .............. 370/229, 230, 230.1, 235, 236, 282, 370/310, 315, 327, 328, 395.4, 464, 469, 370/474, 492, 528, 529
See application file for complete search history.

(56) References Cited

U.S. PATENT DOCUMENTS 6,009,073 A * 12/1999 Kaneko ......................... 370/203
7,953,051 B1 * 5/2011 Li et al. ......................... 370/336

(Continued)

FOREIGN PATENT DOCUMENTS

EP 1890433 A2 * 2/2008
EP 1890447 A2 * 2/2008

(Continued)

OTHER PUBLICATIONS

EPO, Int'l Search Report in PCT/EP2008/059014, Jan. 30, 2009.
EPO, Int'lPreliminary Report on Patentability in PCT/EP2008/059014, Jan. 11, 2011.

(Continued)

*Primary Examiner* — Curtis A Alia
(74) *Attorney, Agent, or Firm* — Patent Portfolio Builders PLLC

(57) ABSTRACT

A method is performed by an intermediate device in a multi-hop wireless network. The method includes receiving a transmission to forward to another device and synchronizing with the transmission based on a format of the transmission. The method further includes selecting a resource portion of the transmission based on information included in the transmission or information previously received, and inserting a signal in the selected resource portion of the transmission. The method also includes forwarding the transmission that includes the signal to the other device.

18 Claims, 18 Drawing Sheets

(56) References Cited

U.S. PATENT DOCUMENTS

| | | | | |
|---|---|---|---|---|
| 8,050,311 | B2 * | 11/2011 | Larsson | 375/211 |
| 2008/0043712 | A1 | 2/2008 | Hart et al. | |
| 2009/0010199 | A1 * | 1/2009 | Adachi et al. | 370/315 |
| 2010/0080166 | A1 * | 4/2010 | Palanki et al. | 370/315 |
| 2010/0097978 | A1 * | 4/2010 | Palanki et al. | 370/315 |

FOREIGN PATENT DOCUMENTS

| | | | |
|---|---|---|---|
| EP | 1916782 | A1 * | 4/2008 |
| EP | 1937006 | A1 * | 6/2008 |
| WO | 2007/053954 | A1 | 5/2007 |
| WO | WO 2007053954 | A1 * | 5/2007 |

OTHER PUBLICATIONS

Ericsson, A Discussion on Some Technology Components for LTE-Advanced, Tdoc R1-082024, May 5, 2008, pp. 1-6, 3GPP TSG-RAN WG1 Meeting #53, Kansas City, Mo., US.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.2.0, Sep. 2007.

3GPP, "3rd Generation Partnership Project; Technical Specification Group Radio Access Network; Evolved Universal Terrestrial Radio Access (E-UTRA); Physical Channels and Modulation (Release 8)", 3GPP TS 36.211 V8.2.0, Mar. 2008.

* cited by examiner

INSERTION OF SIGNALS BY AN INTERMEDIATE DEVICE

TECHNICAL FIELD

Implementations described herein relate generally to communication systems. More particularly, implementations described herein relate to a scheme that allows more efficient use of available channel resources in a communication system.

BACKGROUND

In a communication system, such as a wireless communication system, devices may communicate with one another via an intermediary device. For example, a wireless station and user equipment (UE) may communicate via a repeater. Repeaters may be divided into two types, namely, on-frequency repeaters (OFR) and frequency translating repeaters (FTR). An OFR transmits a repeated signal on the same frequency while a FTR transmits the repeated signal on a different frequency.

The functionality of state-of-the-art repeaters may be enhanced by adding reference signals to the repeated signal. In one approach, a repeater may add reference signals out-of-band to the repeated signal. In another approach, a repeater may add reference signals in-band to the repeated signal. However, under such an approach, the reference signals will cause interference. For example, adding reference signals on top of the repeated signal in a non-orthogonal manner (e.g., direct spreading) will degrade the quality of the repeated signal. Further, a receiving device, such as the wireless station or the UE may not be able to detect a desired signal and/or utilize the reference signals if the reference signals cause collision within the repeated signal. Other considerations, such as the distance between the repeater and the receiving device and the corresponding strength of the reference signal added by the repeater may only exasperate the interference, as well as other disadvantages that naturally flow therefrom under such an approach.

SUMMARY

It is an object to obviate at least some of the above disadvantages and to improve the operability of devices within a communication system.

According to one aspect, a method performed by an intermediate device in a multi-hop network may include receiving a transmission to forward to another device, synchronizing with the transmission based on a format of the transmission, selecting a resource portion of the transmission based on information included in the transmission or information previously received, inserting a signal in the selected resource portion of the transmission, and forwarding the transmission that include the signal to the other device.

According to another aspect, an intermediate device in a multi-hop wireless network, where the intermediate device may include one or more antennas and a processing system to receive a transmission to forward to a device, synchronize with the transmission, select a portion of the transmission based on a transmission coordination that provides at least one of a format of the transmission or resources available in the transmission, insert a signal in the selected portion of the transmission, and forward the transmission that includes the signal to the device.

According to yet another aspect, a computer program may include instructions to receive a transmission to forward to a communication device, synchronize with at one of frequency or time of the transmission, select a resource portion of the transmission based on a format of the transmission or a transmission coordination that includes information indicating the resource portion of the transmission that is unused, insert a control signal or a reference signal in the selected resource portion of the transmission, and forward the transmission that includes the control signal or the reference signal to the communication device.

DETAILED DESCRIPTION

The following detailed description refers to the accompanying drawings. The same reference numbers in different drawings may identify the same or similar elements. Also, the following description does not limit the invention.

The concepts described herein relate to a communication system. The communication system is intended to be broadly interpreted to include any type of wireless network, such as a cellular network and/or a mobile network (e.g., Global System for Mobile Communications (GSM). Long Term Evolution (LTE), Wideband Code Division Multiple Access (WCDMA). Ultra Mobile Broadband (UMB), Universal Mobile Telecommunications Systems (UMTS), Code Division Multiple Access 2000 (CDMA2000), ad hoc networks. High-Speed Packet Access (HSPA), etc.), and a non-cellular network (e.g., Wireless Fidelity (Wi-Fi), Worldwide Interoperability for Microwave Access (WiMax), etc.). In this regard, it will be appreciated that the concepts described herein are not platform dependent and may be implemented within a wide variety of communication systems. The terms communication system and network may be used interchangeably throughout this description. The communication system may include a multi-hop network.

Embodiments described herein may provide that an intermediate device of a communication system may utilize channel resources for inserting signals. The intermediate device may insert the signals with respect to a received signal without causing interference in a receiving device, as described in greater detail below. For example, in one implementation, the inserted signals may be added to an unused portion of the received signal.

The term inserted signal is intended to be broadly interpreted to include, for example, any type of signal that may facilitate communication within the communication system and/or between devices within the communication system. For example, the inserted signal may include a reference signal. A reference signal may include, for example, a signal that may allow a device to perform channel estimation, power control, demodulation, or another type of communication-related operation. Additionally, or alternatively, the inserted signal may include a control signal. The terms inserted signal, reference signal and control signal may be used interchangeably throughout this description.

Figure 1A:
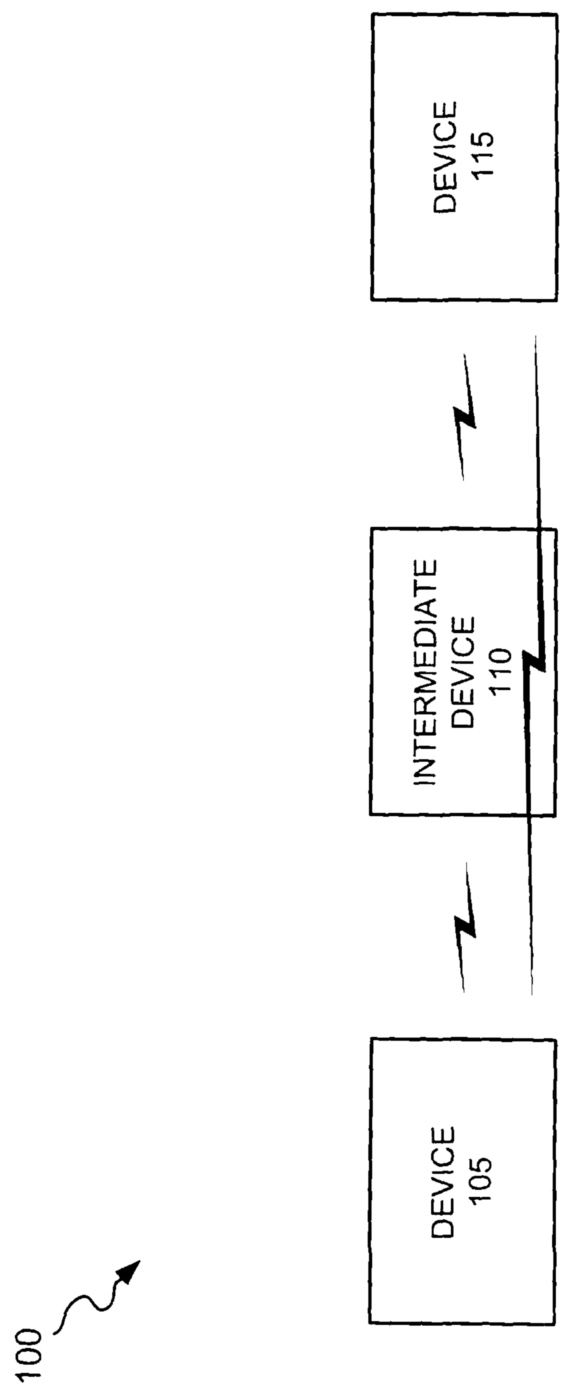
FIGS. 1A and 1B are diagrams illustrating devices communicating with one another via an intermediate device.

FIG. 1A is a diagram illustrating an exemplary communication system 100 in which the concepts described herein may be implemented. As illustrated, communication system 100 may include a device 105, an intermediate device 110, and a device 115. A device (i.e., device 105 and/or intermediate device 110) may include, for example, a UE, a gateway, a base station, a base station controller, a switch, a relay, a repeater, a bridge, a router, any combination thereof, and/or another type of device (e.g., a satellite). The device may operate at layer 1, layer 2, and/or at a higher layer. As illustrated in FIG. 1A, the devices may be communicatively coupled. For example, the devices may be communicatively via wireless communication links (e.g., radio, microwave, etc.).

Figure 1B:
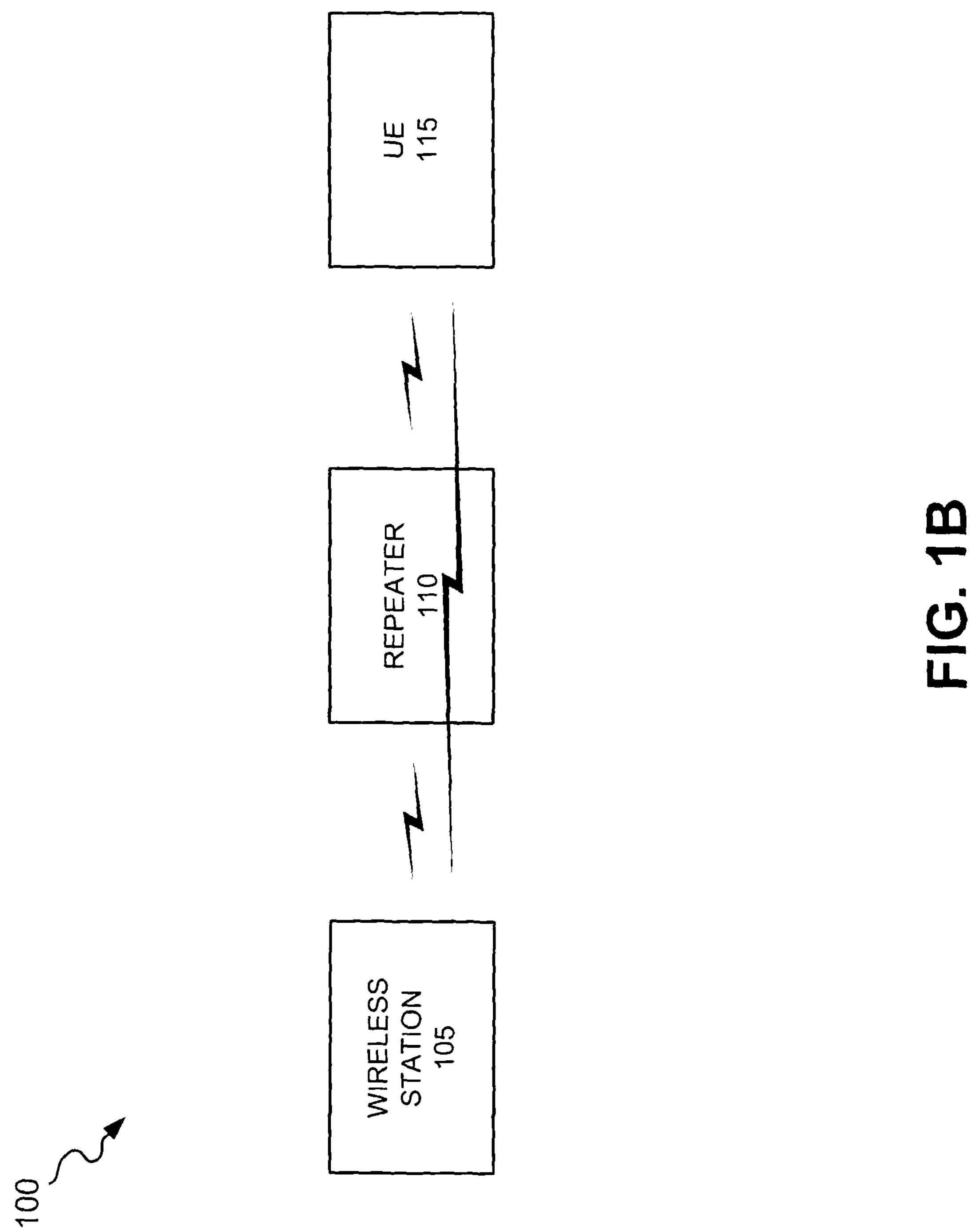

Since the concepts described herein are applicable to a variety of devices in communication system 100, communication system 100 will be described based on the exemplary devices illustrated in FIG. 1B. FIG. 1B illustrates an exemplary implementation in which intermediate device 110 includes a repeater, device 105 includes a wireless station, and device 115 includes a user equipment (UE). FIG. 1B illustrates wireless station 105, repeater 110 and UE 115 as communicatively coupled to form a multi-hop network.

Wireless station 105 may include a device having communication capability. The term wireless station is intended to be broadly interpreted to include, for example, a device that may communicate with UE 115 via repeater 110. For example, a wireless station may include a base station (BS), a base station transceiver (BTS) (e.g., in a GSM communication system), an eNodeB (e.g., in a LTE communication system), a Node B (e.g., in a UMTS communication system), or some other type of device.

Repeater 110 may include a device having communication capability. For example, repeater 110 may include an OFR or a FTR. Repeater 110 may further include a device capable of inserting signals with respect to a received signal from wireless station 105 and UE 115. Repeater 110 will be described in greater detail below.

UE 115 may include a device having communication capability. For example. UE 115 may include a telephone, a computer, a personal digital assistant (PDA), a gaming device, a music playing device, a video playing device, a web browser, a personal communication system (PCS) terminal, a pervasive computing device, and/or some other type of device.

Figure 2A:
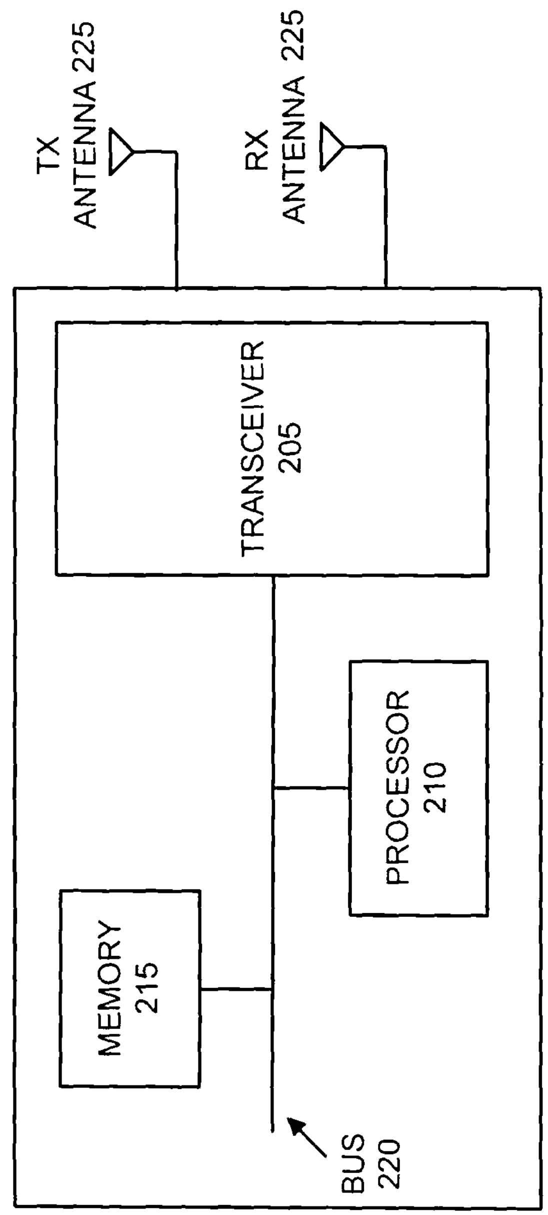
FIGS. 2A and 2B are diagrams illustrating exemplary components of the repeater depicted in FIG. 1B.

FIG. 2A is a diagram illustrating exemplary components of repeater 110. As illustrated, repeater 110 may include a transceiver 205, a processor 210, a memory 215, a bus 220, and transmit (TX) and receive (RX) antennas 225. The term component is intended to be broadly interpreted to include, for example, hardware, software and hardware, firmware, software, or some other type of component.

Transceiver 205 may include a component capable of transmitting and/or receiving information over wireless channels via TX/RX antennas 225.

Processor 210 may include a component capable of interpreting and/or executing instructions. For example, processor 210 may include, a general-purpose processor, a microprocessor, a data processor, a co-processor, a network processor, an application specific integrated circuit (ASIC), a controller, a programmable logic device, a chipset, and/or a field programmable gate array (FPGA).

Memory 215 may include a component capable of storing information (e.g., data and/or instructions). For example, memory 215 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Bus 220 may include a component capable of providing communication between the components of repeater 110. For example, bus 220 may include a system bus, an address bus, a data bus, and/or a control bus. Bus 220 may also include bus drivers, bus arbiters, bus interfaces and/or clocks.

TX/RX antennas 225 may include a component capable of receiving information and transmitting information via wireless channels.

Although FIG. 2A illustrates exemplary components of repeater 110, in other implementations, repeater 110 may include fewer, additional, and/or different components than those depicted in FIG. 2A. For example, repeater 110 may include a component to amplify signals received from wireless station 105 and/or UE 115. Repeater 110 may also include a component to translate one frequency to another frequency (e.g., such as in a FTR). Additionally, or alternatively, repeater 110 may include a component to perform other communication-related operations. For example, repeater 110 may include a component capable of coding/decoding, modulation/de-modulation, etc., signals received from wireless station 105 and/or UE 115. Additionally, or alternatively, repeater 110 may include, for example, a layer 2 relay, a layer 2 bridge, a layer 3 relay, and/or a layer 3 router.

Figure 2B:
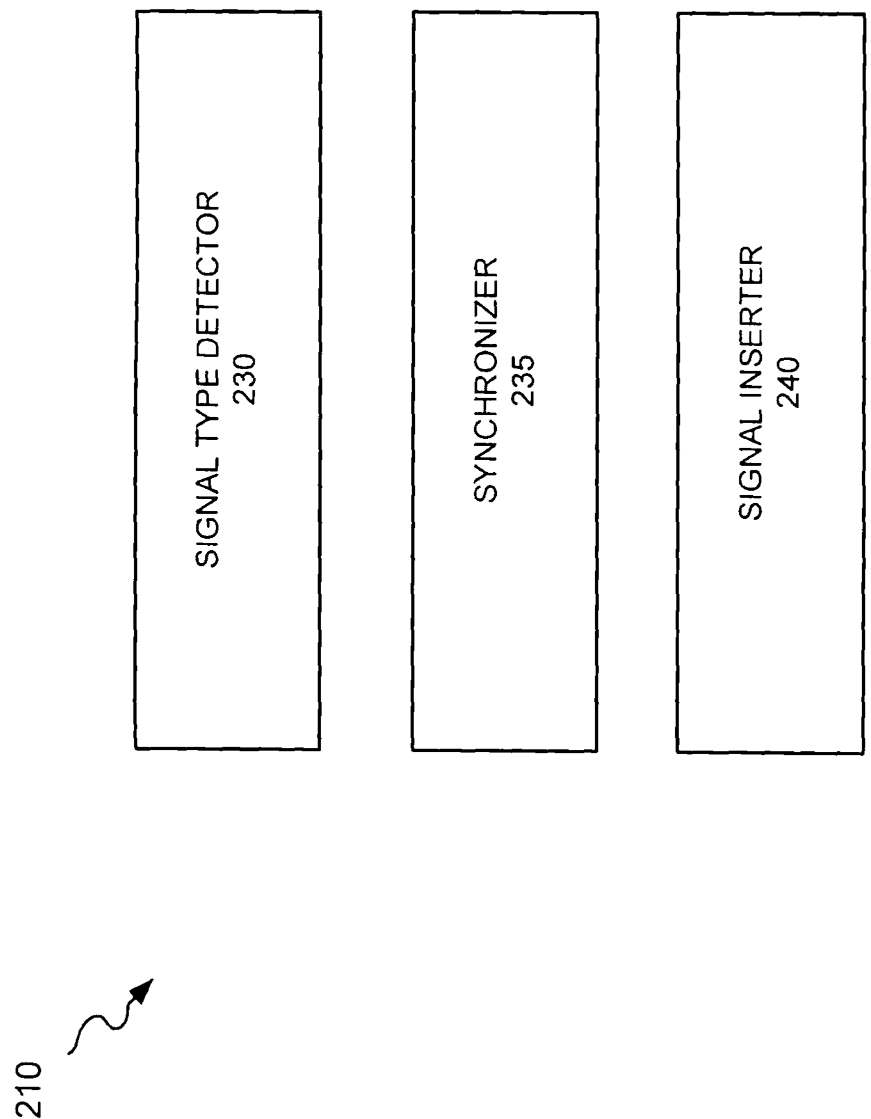

FIG. 2B is a diagram illustrating exemplary functional components capable of performing one or more operations associated with the concepts described herein. In one embodiment these exemplary functional components may be implemented in processor 210 of repeater 110. However, it will be appreciated that these functional components may be implemented in connection with, for example, other components (e.g., transceiver 205) of repeater 110, in combination with two or more components (e.g., transceiver 205, processor 210, memory 215) of repeater 110, and/or as an additional component(s) to those previously described in FIG. 2A.

Signal type detector 230 may determine the kind of signal that repeater 110 receives from wireless station 105 and UE 115. For example, the kind of signal may include the format of the received signal and/or the communication standard (e.g., LTE, CDMA, etc.) associated with the received signal. This is contrasted with existing intermediate devices, such as a repeater, in which the repeater may be agnostic and the kind of signal to repeat is unimportant. For example, existing repeaters may only need to know the bandwidth it needs to repeat. As will be described in greater detail below, determining the format of the signal facilitates the insertion of signals (e.g., reference signals, control signals, etc.) by repeater 110 into received signals from wireless station 105 and UE 105.

In one implementation, signal type detector 230 may determine the kind of signal based on information received from wireless station 105. For example, wireless station 105 may inform repeater 110 of the kind of signal that wireless station 105 intends to transmit. Based on the information received from wireless station 105, signal type detector 230 may determine the kind of subsequent signals received from wireless station 105 and UE 115. In another implementation, signal type detector 230 may be pre-configured to operate according to a particular signal format.

Synchronizer 235 may synchronize with a received signal so that a signal may be inserted into the received signal. For example, synchronizer 235 may involve synchronizing with a received signal in terms of frequency and time, time by itself, etc.

Signal inserter 240 may insert a signal into the received signal based on the operation of signal type detector 230 and synchronizer 235. For example, signal inserter 240 may insert a signal (e.g., reference signals, control signals, etc.) into unused channel resources associated with the received signal. For example, the unused channel resources of the received signal may correspond to a frequency/time instance that does not include information. In one implementation, signal inserter 240 may insert a signal in the unused channel resources based on a grant of resources from wireless station 105 or some other type of coordination.

Although FIG. 2B illustrates exemplary functional components of repeater 110, in other implementations, repeater 110 may include additional, fewer or different components than those described in FIG. 2B.

Since the concepts described herein are applicable to a variety communication standards and/or formats, for ease of description, these concepts will be described in connection with the LTE standard. FIGS. 3-8 provide description relating to the LTE standard and the signal format associated therewith. As will be described below, intermediate device 110 may insert signals into LTE downlink and uplink transmissions.

Figure 3:
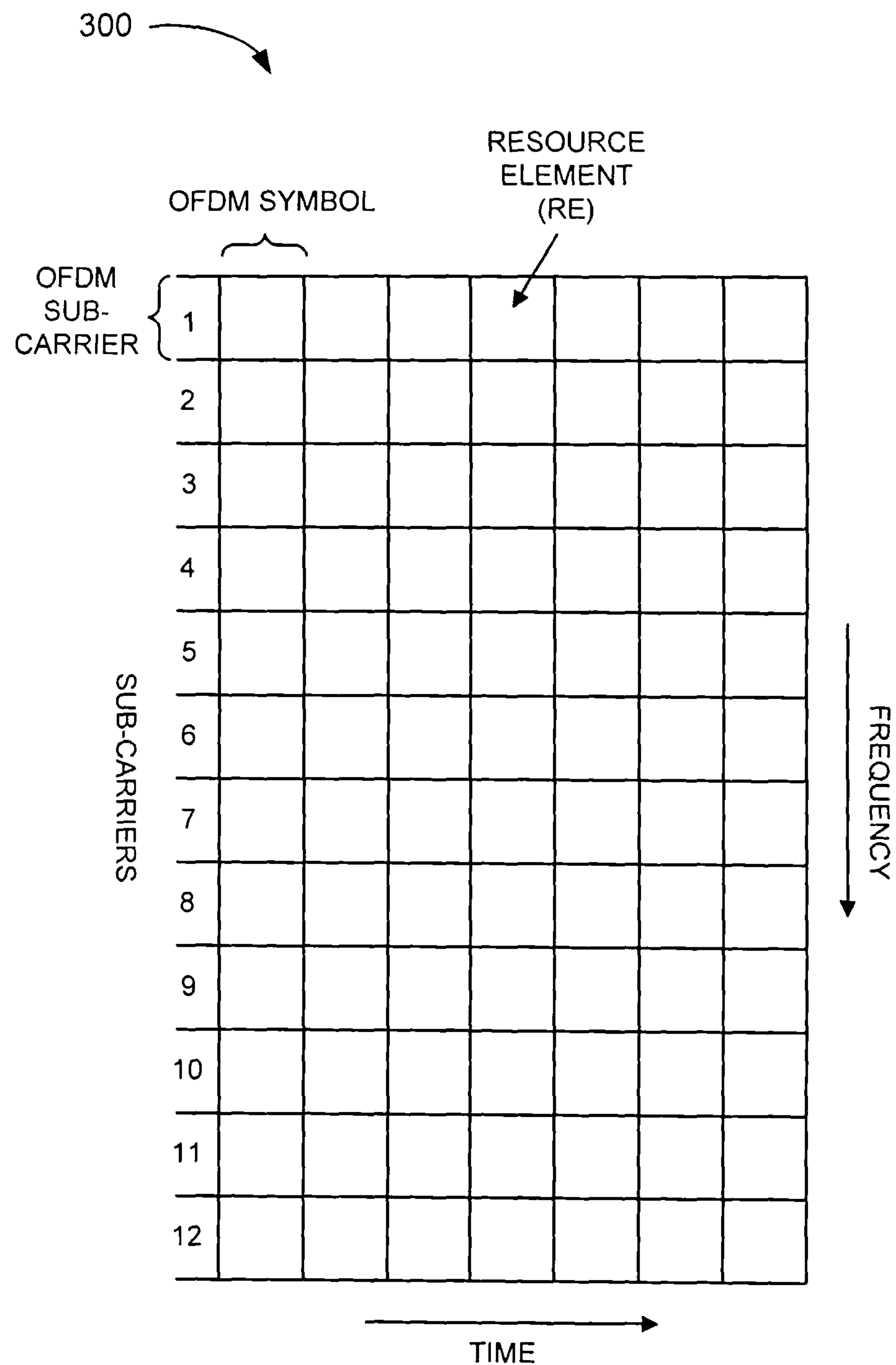
FIG. 3 is a diagram illustrating an exemplary orthogonal frequency-division multiplexing (OFDM) time-frequency grid.

A downlink transmission of the LTE or evolved universal terrestrial radio access network (E-UTRAN) is based on orthogonal frequency division multiplexing (OFDM). For example, as illustrated in FIG. 3, the LTE downlink may be modeled as an OFDM time-frequency grid 300, where each resource element (RE) may correspond to one OFDM sub-carrier during one OFDM symbol interval. In LTE, the downlink sub-carrier spacing may correspond to 15 kHz.

In the frequency domain, the downlink sub-carriers may be grouped into resource blocks, where each resource block may include twelve consecutive sub-carriers. The LTE physical layer standard permits a downlink carrier to include any number of resource blocks ranging from six and upwards.

Figure 4:
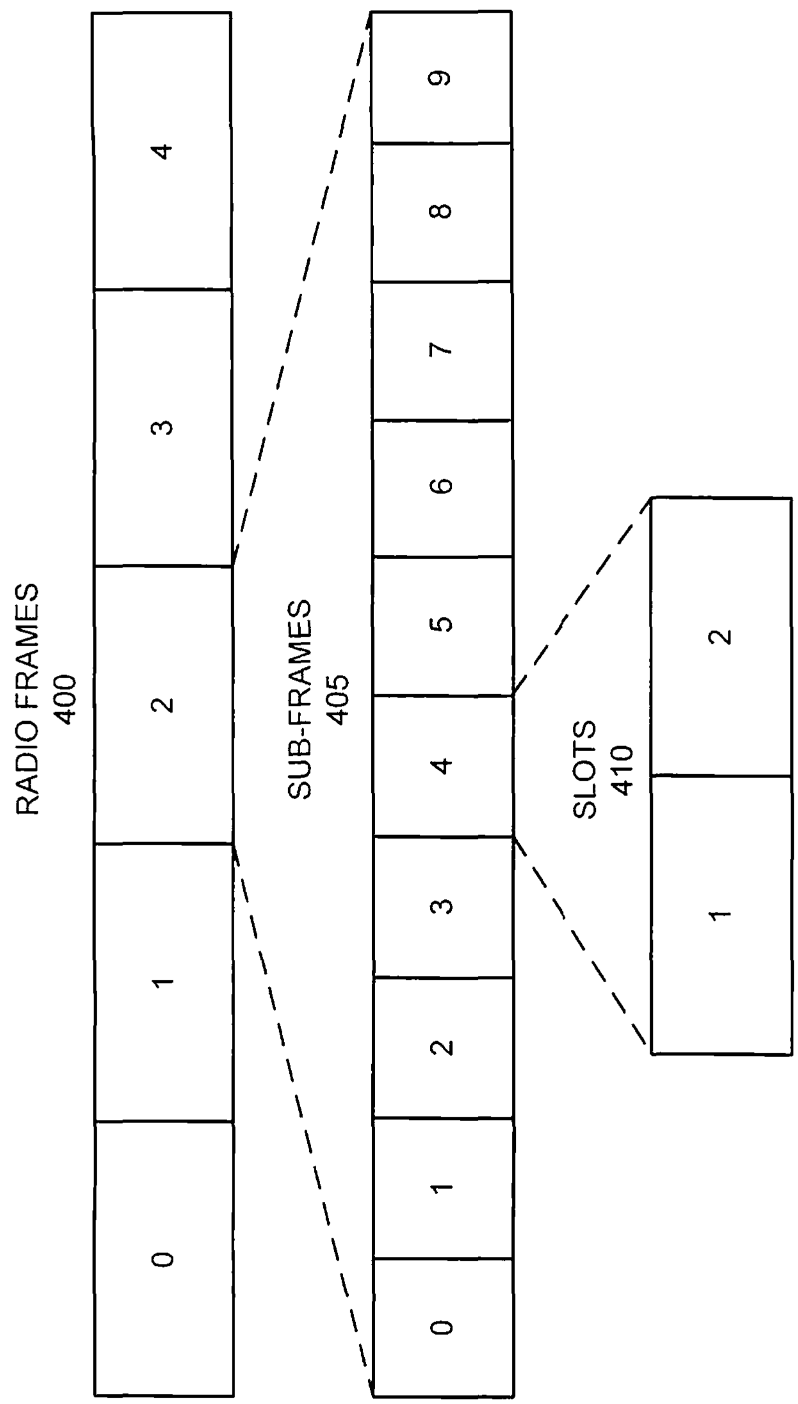
FIG. 4 is a diagram illustrating an exemplary radio frame and its sub-components.

FIG. 4 illustrates an exemplary time-domain structure for LTE downlink or uplink transmissions. As illustrated, a LTE transmission may include radio frames 400. Each radio frame 400 may be equivalent to 10 milliseconds (ms), and may include a series of sub-frames 405. Each sub-frame 405 may have duration of 1 ms. A sub-frame 405 may include two slots 410. Each slot 410 may have duration of 0.5 ms.

According to the LTE standard, downlink reference signals may include reference symbols that are known symbols inserted into an OFDM time-frequency grid. The reference symbols may be used by UE 115 for, among other things, downlink channel estimation or to enable coherent detection. Also, according to the LTE standard, a downlink antenna port may correspond to an antenna that is visible to UE 115, the antenna having a unique set of reference symbols (i.e., one antenna mapping to one antenna port). However, in other implementations, multiple antennas may be mapped to the same antenna port, may transmit the same set of reference symbols, and may not be distinguishable to UE 115.

Currently, there are three types of reference signals that may be transmitted on the LTE downlink: cell-specific reference signals, multi-media broadcast over a single frequency network (MBSFN) reference signals, and UE-specific reference signals (sometimes referred to as dedicated reference signals). The cell-specific reference signals may correspond to a downlink transmit antenna port (up to four). MBSFN reference signals may relate to an MBSFN frame. A UE-specific reference signal may be transmitted on a downlink and may be used for channel estimation by a certain UE 115 or group of UEs 115.

In FIGS. 5-7D are exemplary OFDM time-frequency grids corresponding to the LTE format. The LTE format provides for different downlink formats depending on the number of transmit antenna ports involved. In the case of downlink multi-antenna transmission (e.g., transmit diversity and spatial multiplexing), UE 115 may be able to identify and estimate the channel corresponding to each transmit antenna port. In order to enable this, a downlink reference signal may be transmitted from each antenna port.

Figure 5:
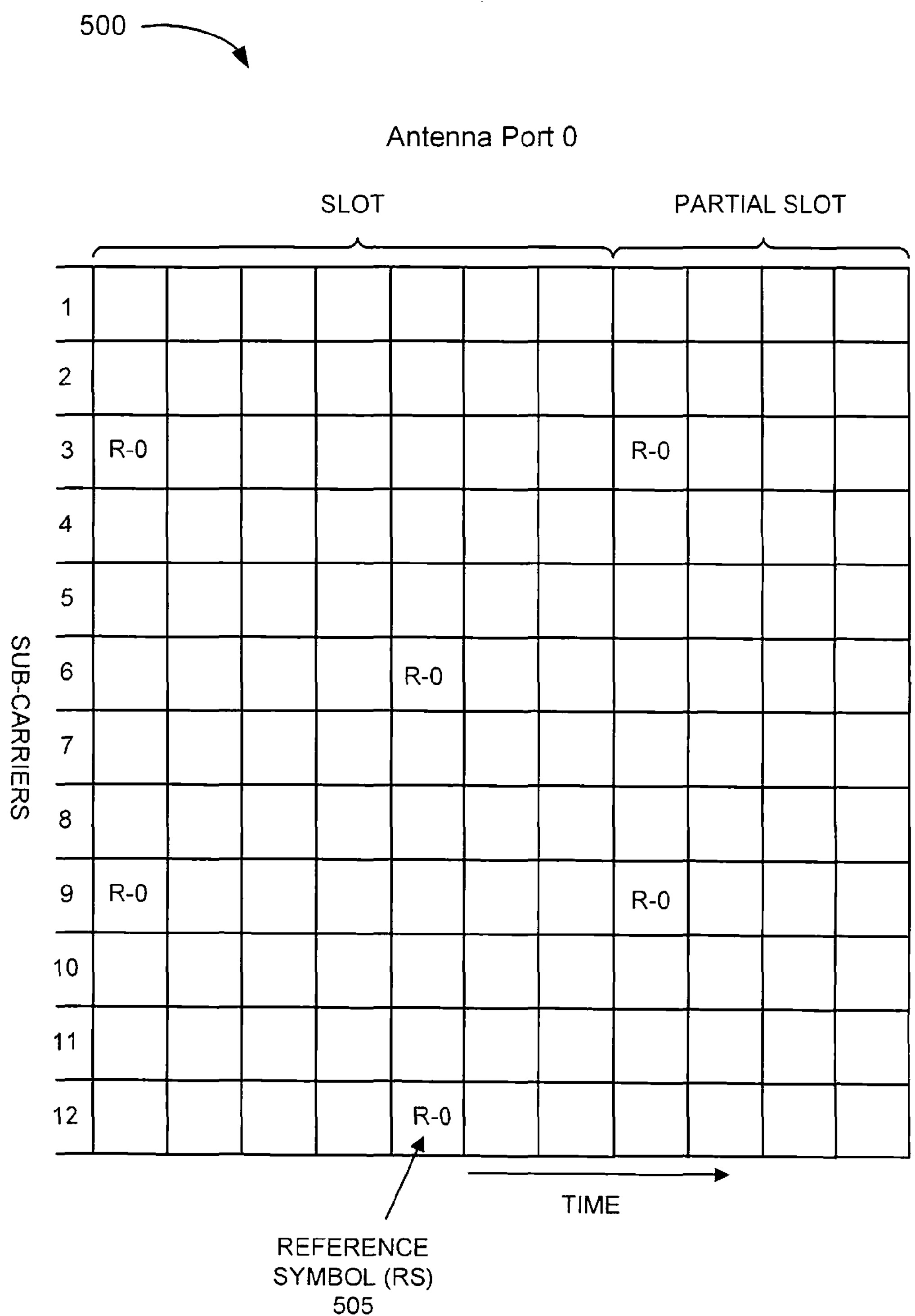
FIG. 5 is a diagram illustrating an exemplary OFDM time-frequency grid that may be associated with a single antenna port system.

FIG. 5 illustrates an exemplary OFDM time-frequency grid 500. OFDM time-frequency grid 500 relates to a single transmit antenna associated with an antenna port 0. As illustrated, a cell-specific unicast reference signal may be inserted into a specific resource element. That is, reference symbols 505 may be inserted within the first and the third to the last resource element of a slot. A resource block includes four reference symbols.

In case of a downlink multi-antenna transmission (e.g., transmit diversity and spatial multiplexing). UE 115 may be able to identify and estimate a channel corresponding to each transmit antenna. Thus, a downlink reference signal may be transmitted from each antenna port.

Figure 6A:
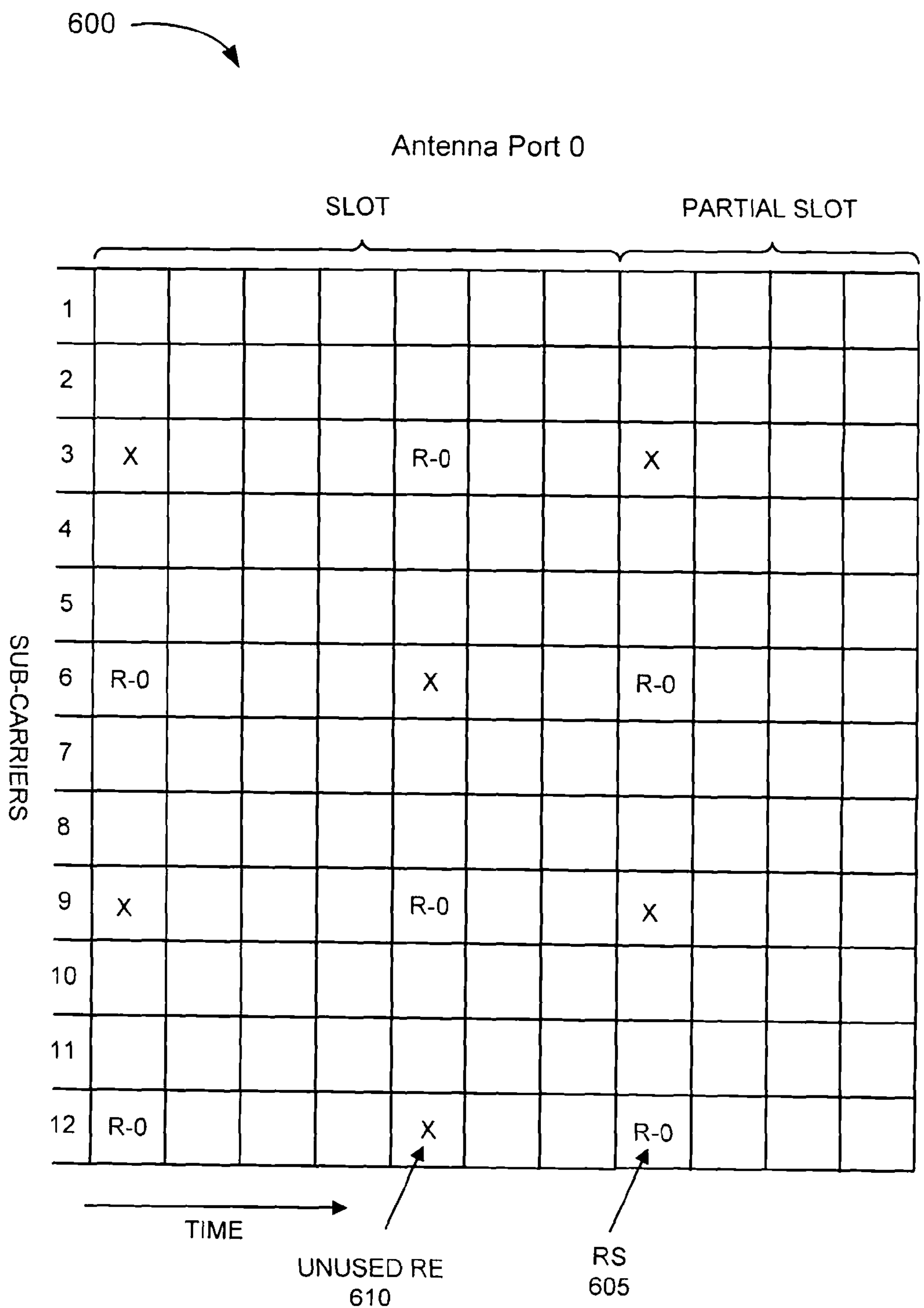
FIGS. 6A-6B are diagrams illustrating exemplary OFDM time-frequency grids that may be associated with a two antenna port system.
Figure 6B:
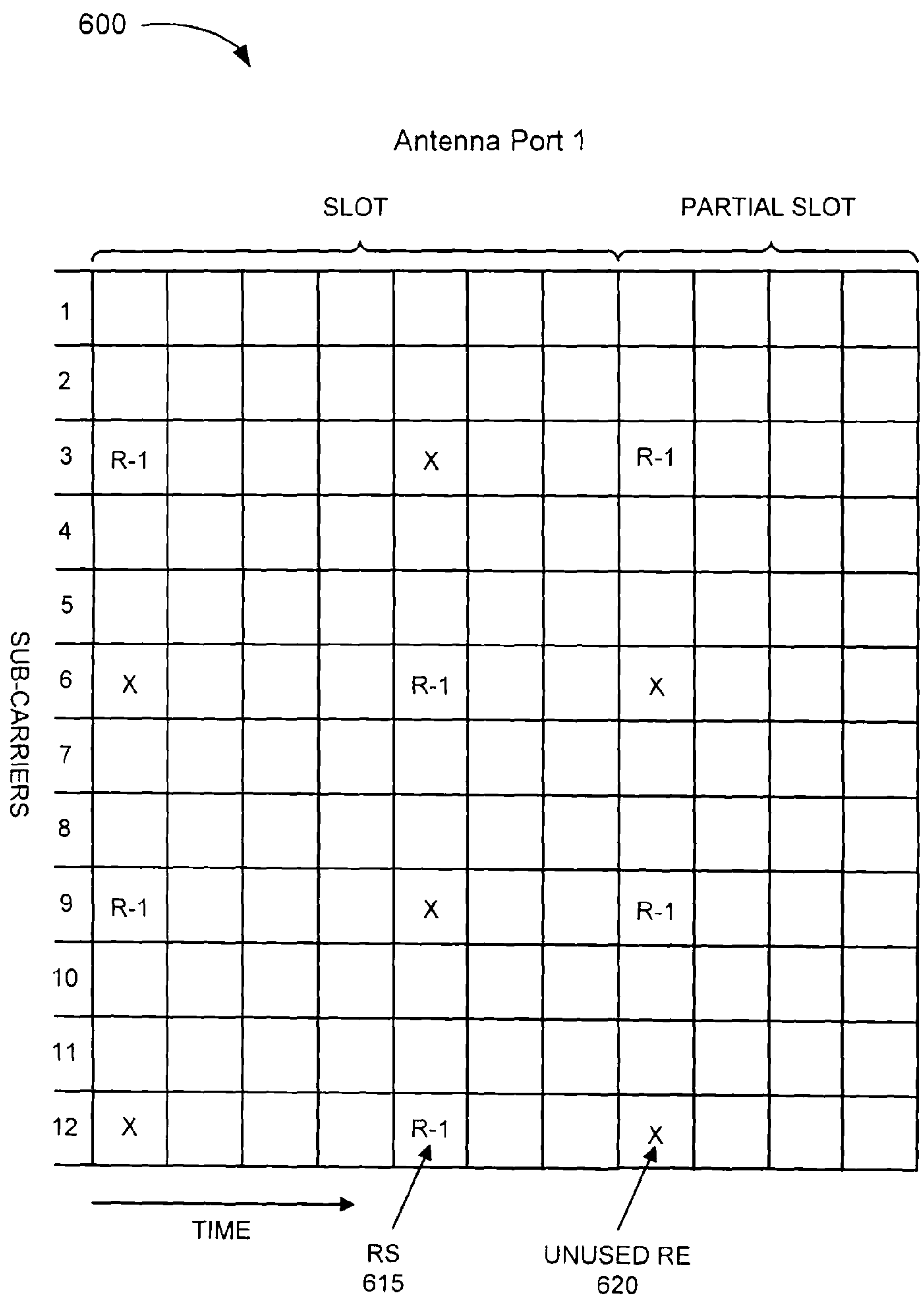
Figure 7A:
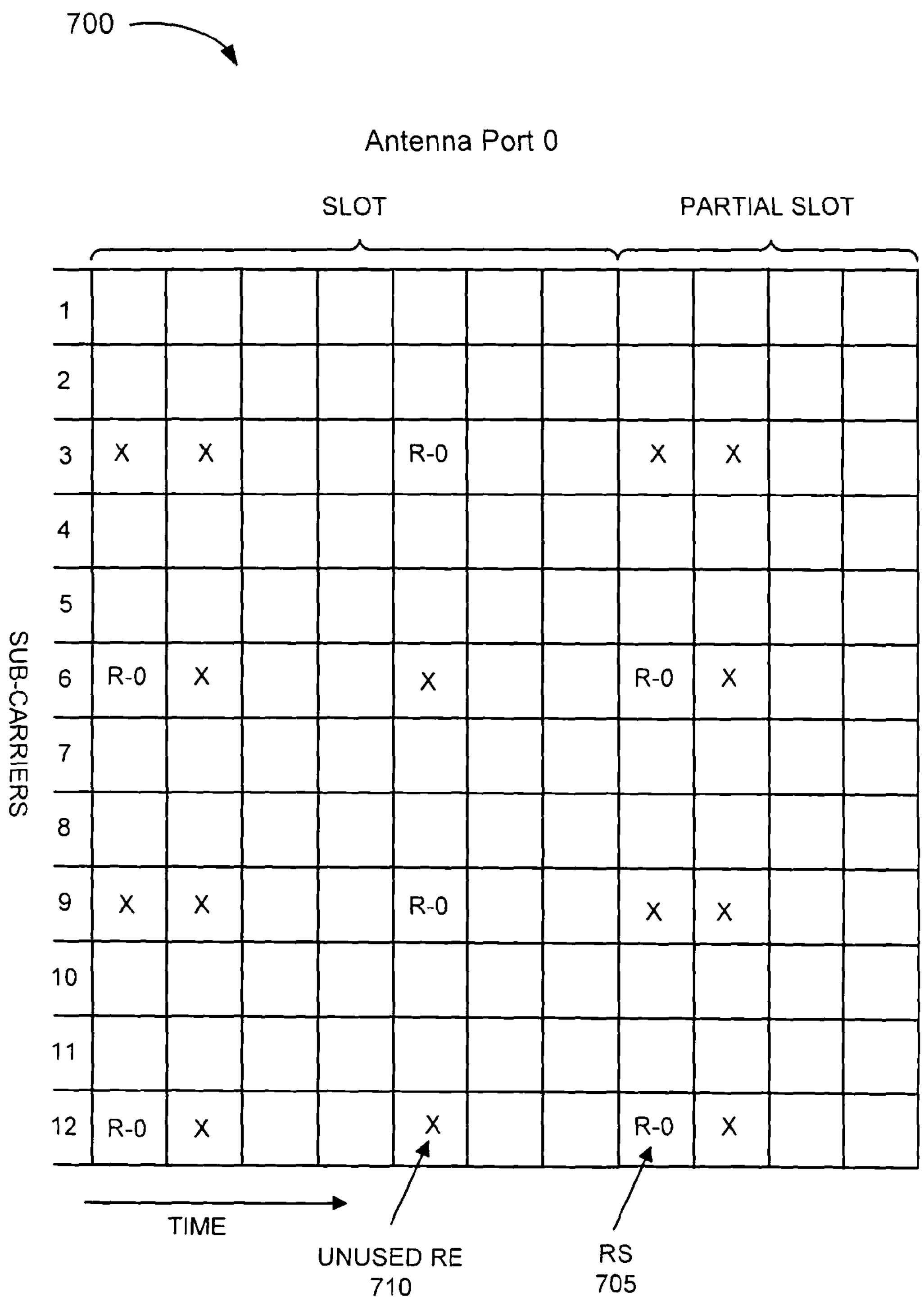
FIGS. 7A-7D are diagrams illustrating exemplary OFDM time-frequency grids that may be associated with a four antenna port system.
Figure 7B:
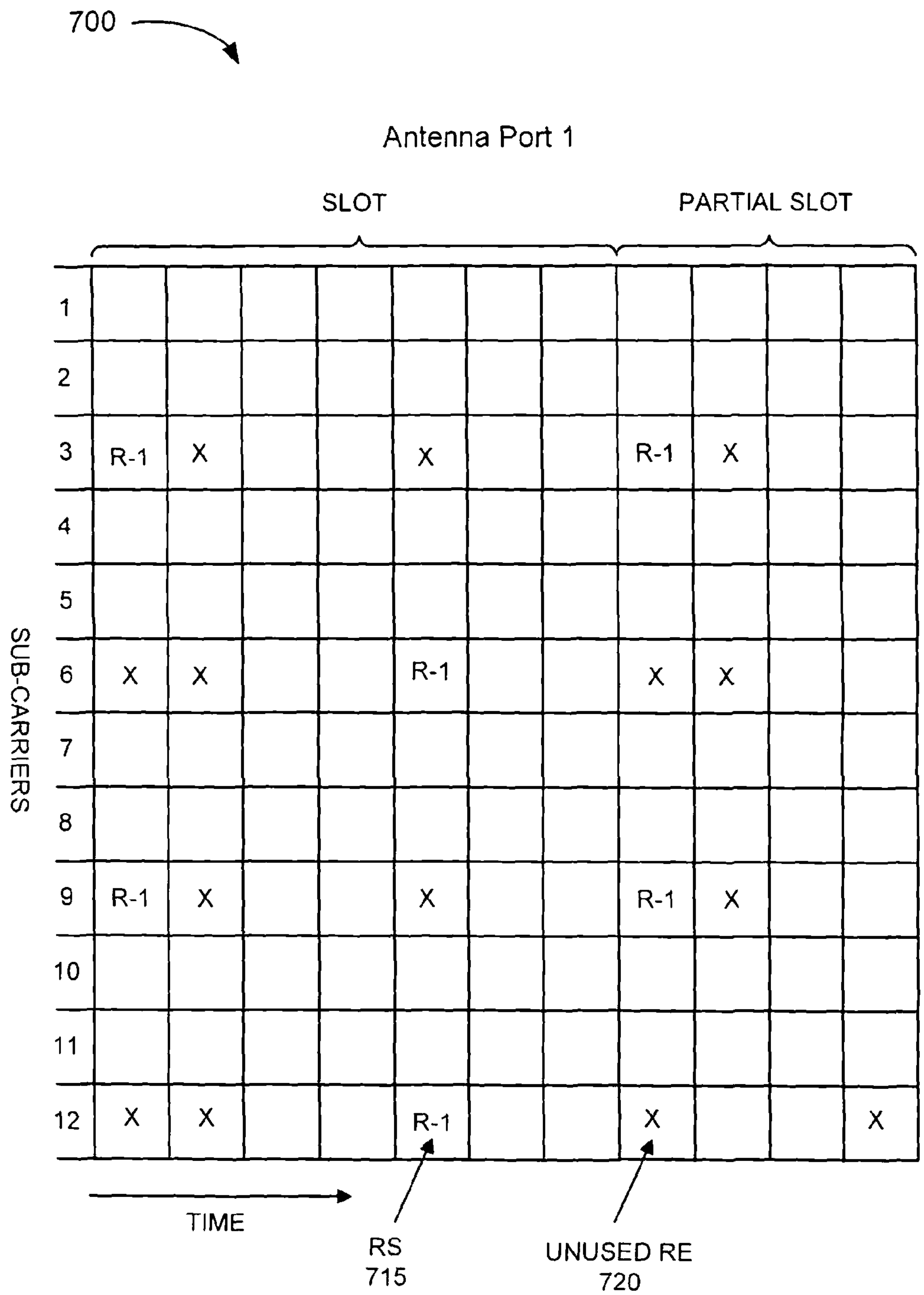
Figure 7C:
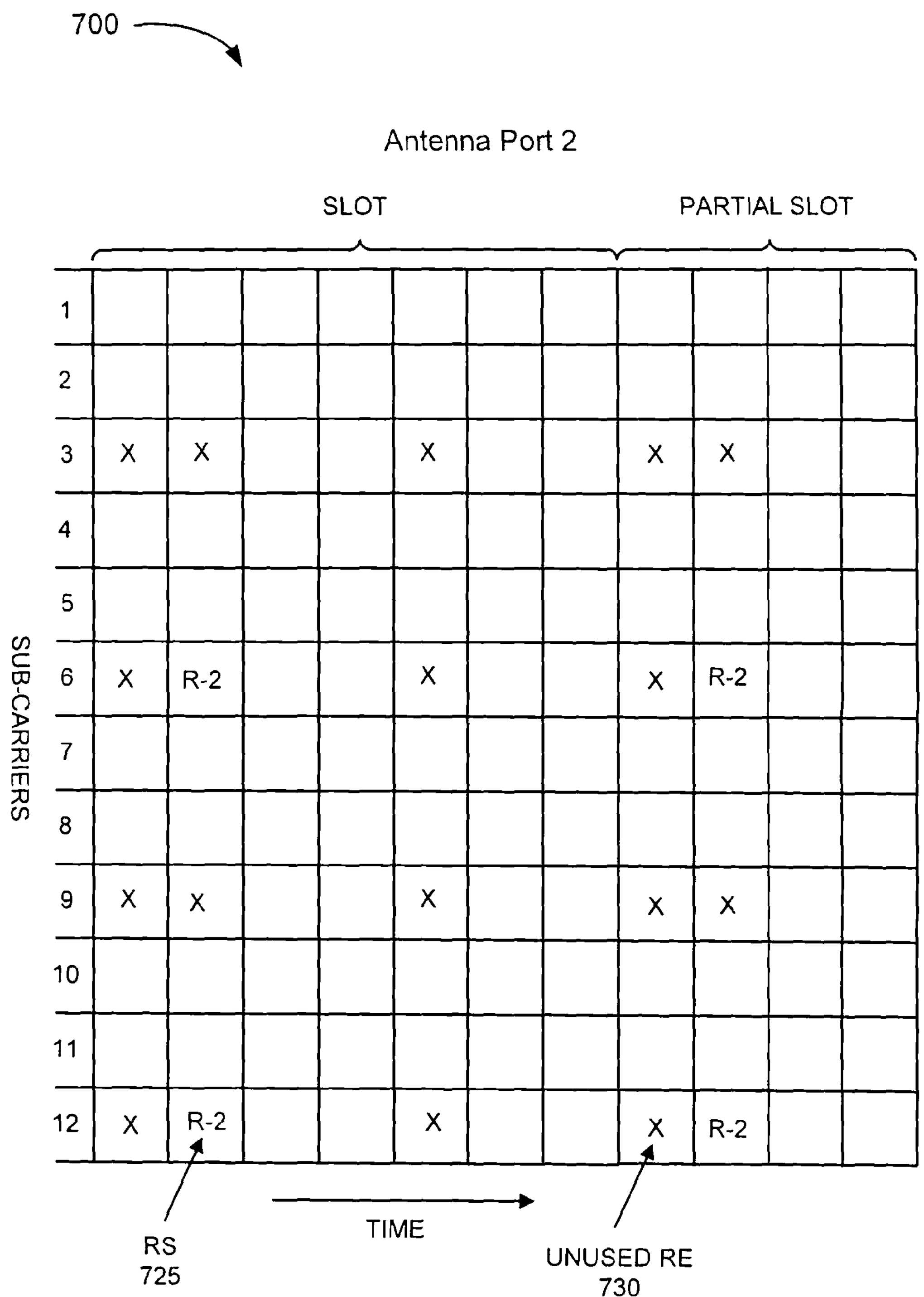
Figure 7D:
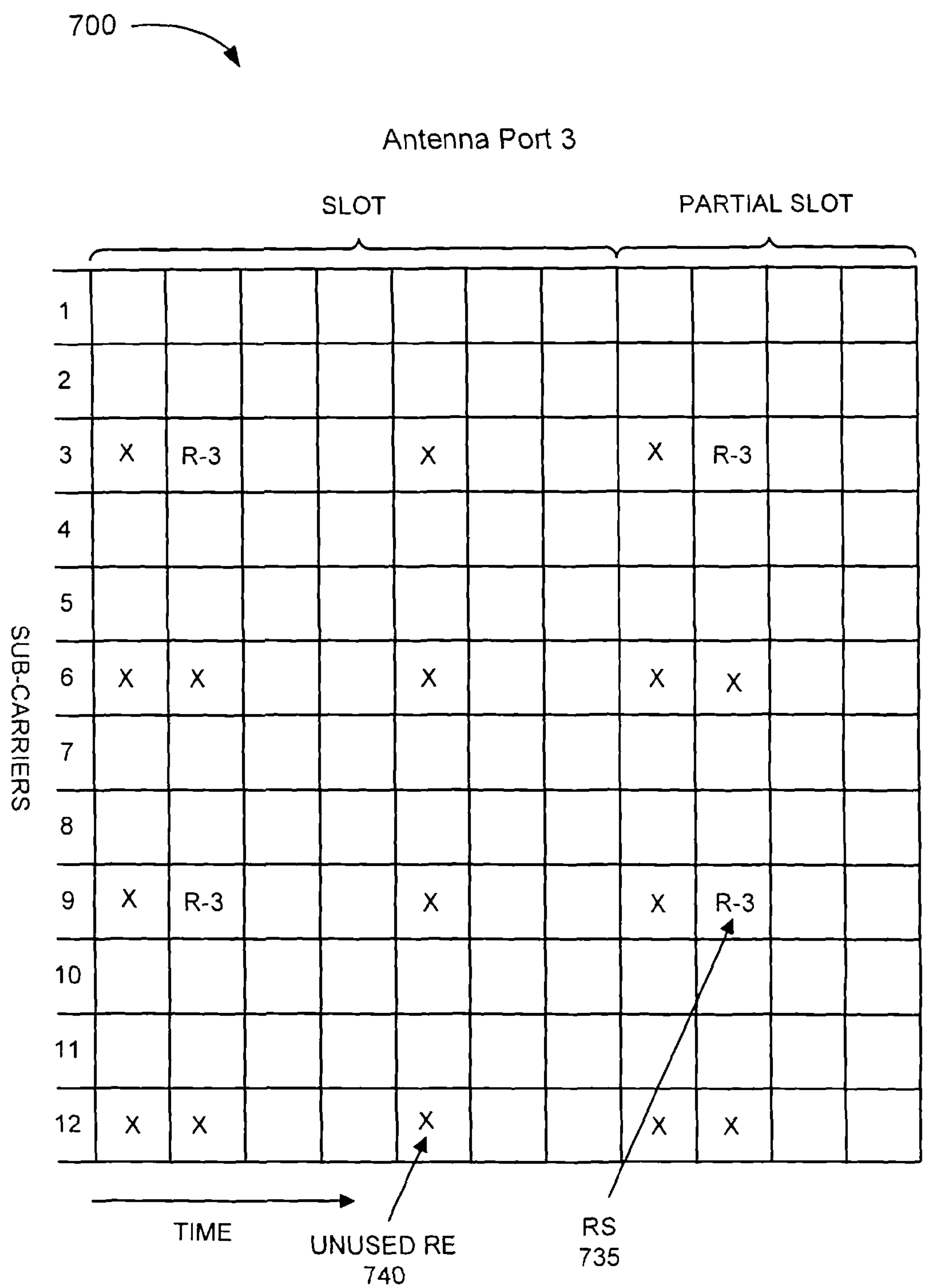

FIGS. 6A and 6B illustrate an exemplary OFDM time-frequency grid 600 associated with two transmit antenna ports (i.e., an antenna port 0 and an antenna port 1). As illustrated, reference symbols 605 of antenna port 0 are frequency-shifted by three sub-carriers relative to reference symbols 615 of antenna port 1. OFDM time-frequency grid 600 of antenna port 0 includes unused resource elements 610 and OFDM time-frequency grid 600 of antenna port 1 includes unused resource elements 620. In this regard, there is no interference to reference symbols between different antenna ports. FIGS. 7A-7D illustrate an exemplary OFDM time-frequency grid 700 associated with four transmit antenna ports (i.e., an antenna port 0, an antenna port 1, an antenna port 2, and an antenna port 3). As illustrated, reference symbols 705, 715, 725, and 735 may be transmitted from antenna ports 0, 1, 2 and 3, respectively. Additionally, OFDM time-frequency grid 700 includes unused resource elements 710, 720, 730, and 740 corresponding to antenna ports 0, 1, 2, and 3, respectively. The reference symbol density of antenna ports 2 and 3 may be less than the reference symbol density of antenna ports 0 and 1.

Downlink layer one and layer two (L1/L2) control signaling may be used for transmitting downlink scheduling assignments required for UE 115 to properly receive, demodulate and decode a downlink shared channel (DL-SCH), uplink scheduling grants that inform UE 115 about resources and transport format for uplink (UL)-SCH transmission, and hybrid automatic repeat request (ARQ) acknowledgements in response to UL-SCH transmission.

For uplink transmissions, the LTE includes two types of reference signals, namely, demodulation reference signals and sounding reference signals. Described below, in FIG. 8, is an exemplary uplink sub-frame.

Figure 8:
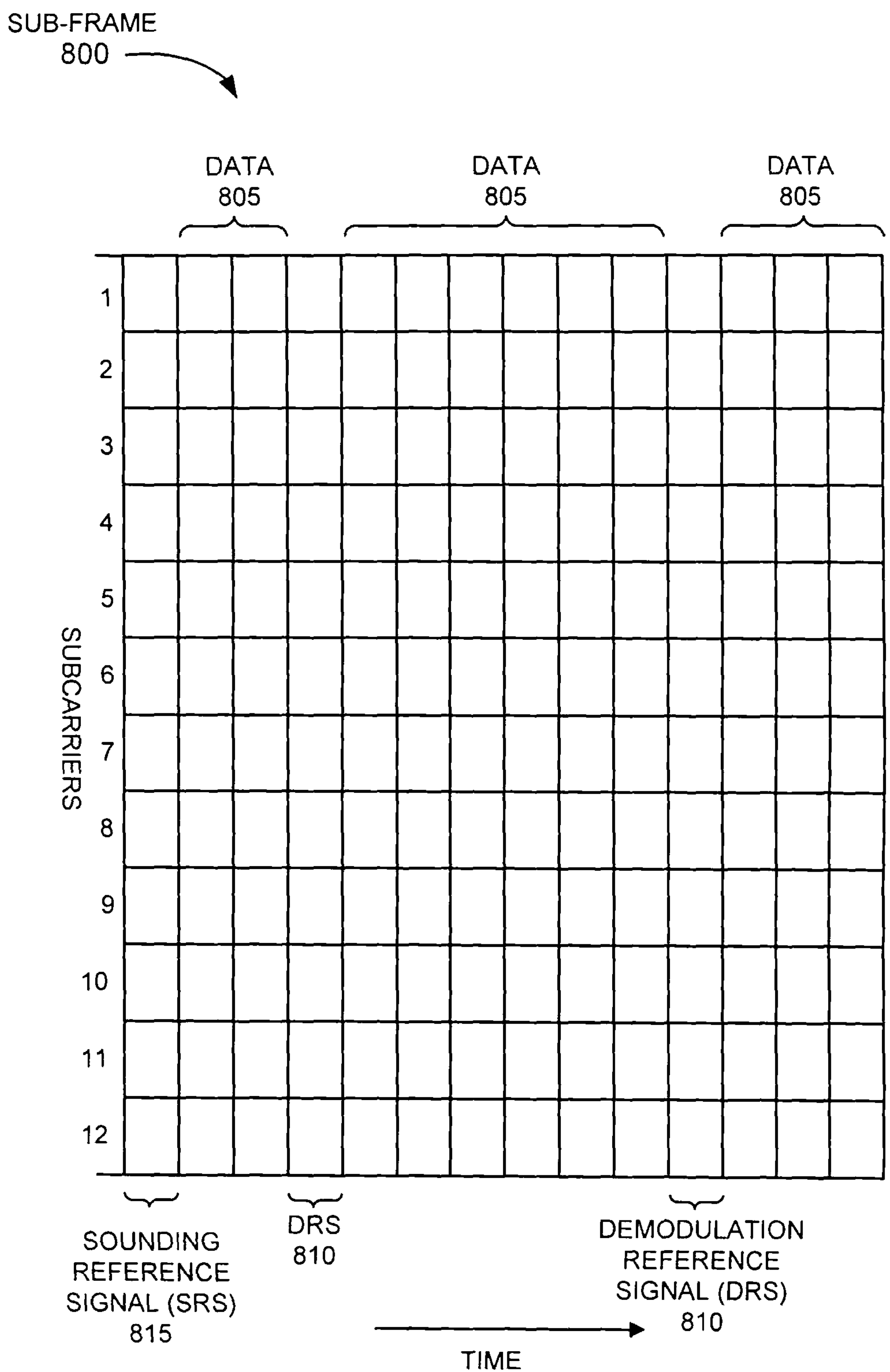
FIG. 8 is a diagram illustrating an exemplary OFDM time-frequency grid that may be associated with an uplink transmission.

FIG. 8 is a diagram of an exemplary sub-frame 800. For example, sub-frame 800 may correspond to an OFDM time-frequency grid for an uplink transmission. As illustrated, sub-frame 800 may include data 805, a demodulation reference signal (DRS) 810, and a channel sounding reference signal (SRS) 815. Data 805 may include uplink data. DRS 810 may be associated with transmission of uplink data and/or control signaling (e.g., to facilitate coherent demodulation). SRS 815 may be periodically transmitted by UE 115. Wireless station 105 may utilize SRS 815 to estimate uplink characteristics, control the uplink power, estimate the timing of UE 115 transmissions, and/or to derive timing-control commands for uplink time alignment.

Figure 9:
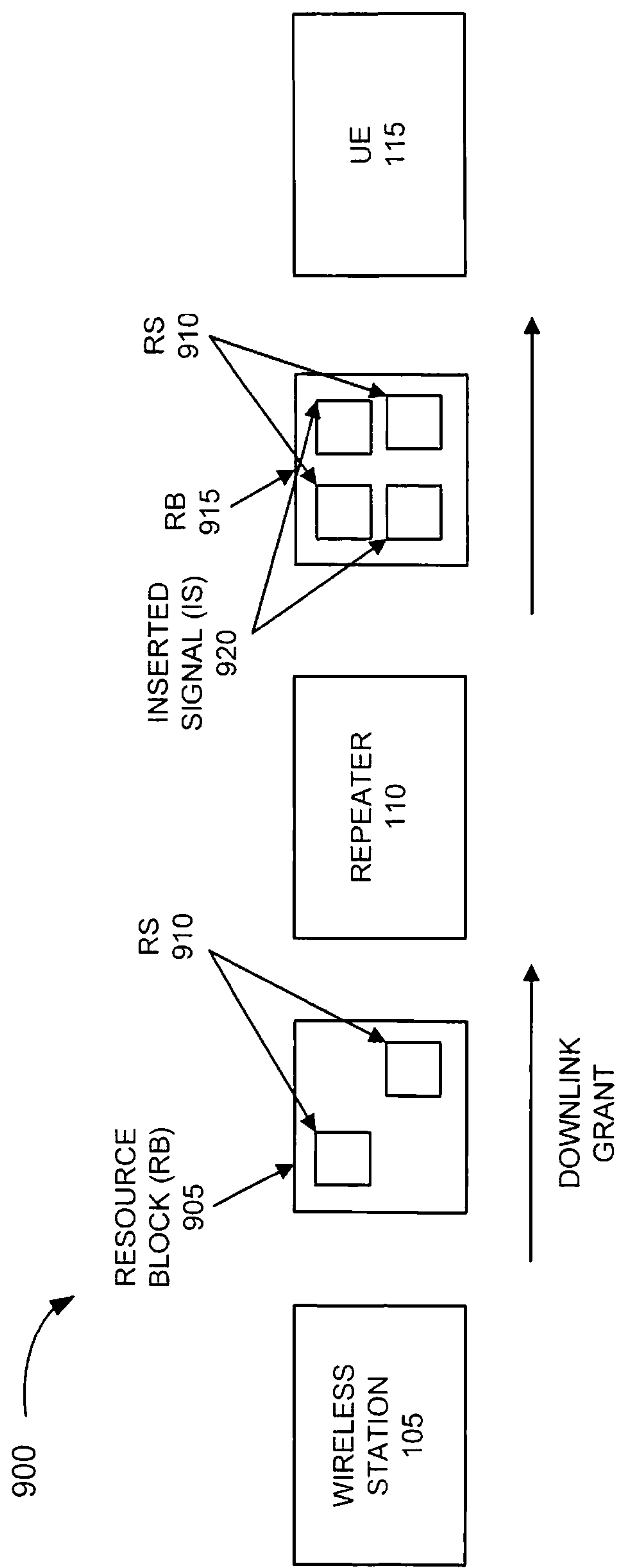
FIGS. 9-11 are diagrams illustrating exemplary scenarios that may be associated with the concepts described herein.
Figure 10:
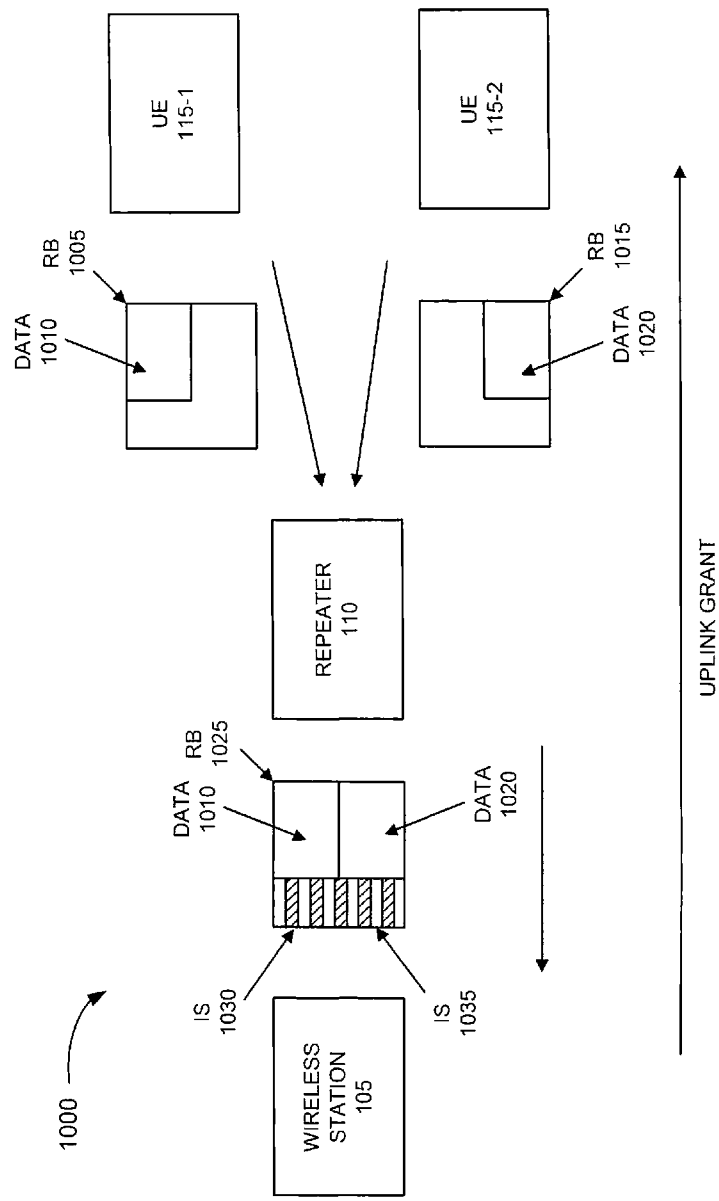
Figure 11:
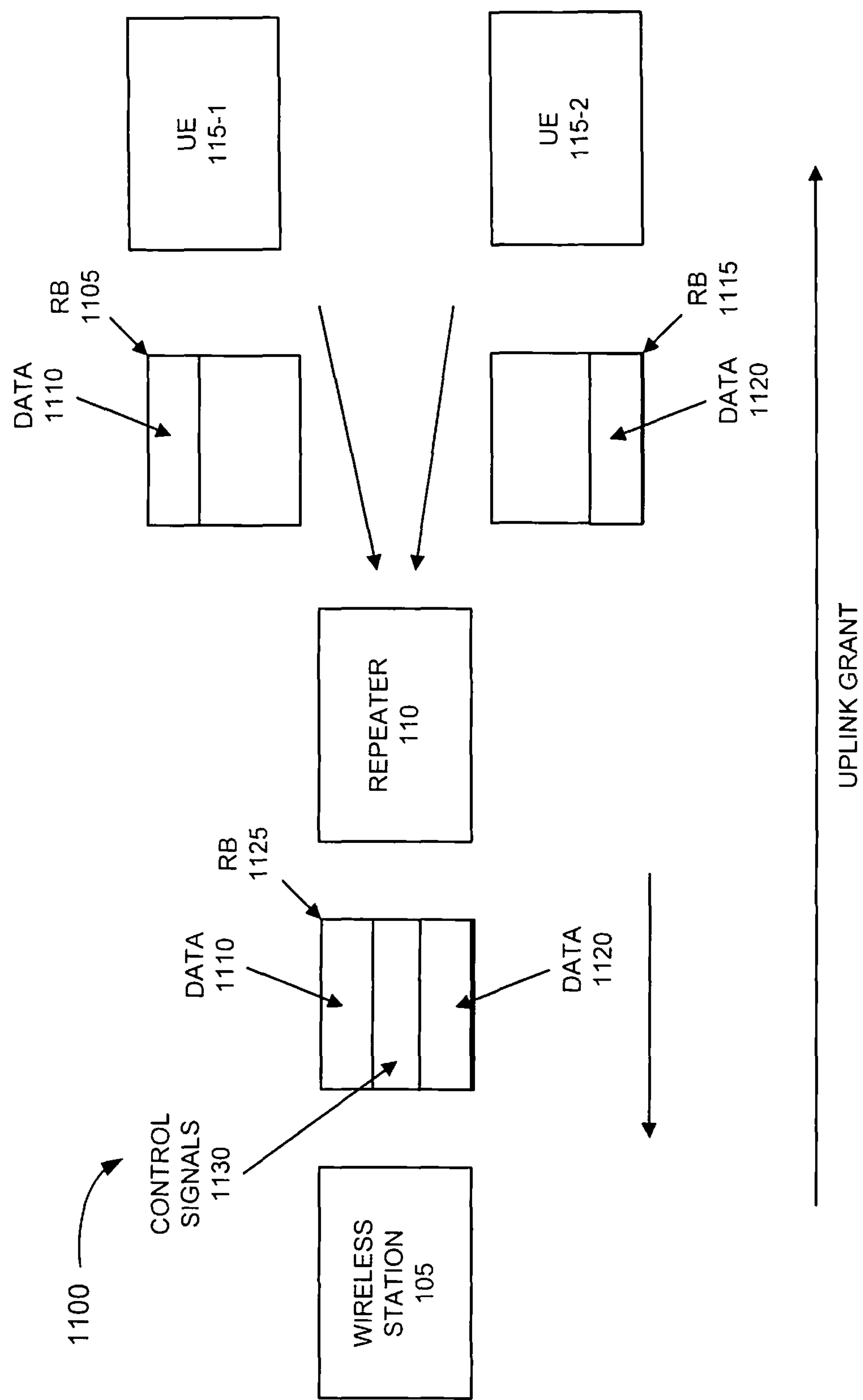

Described below, in connection with FIGS. 9-11, are exemplary scenarios illustrative of the concepts described herein in which repeater 110 may insert signals with respect to received signals from wireless station 105 and UE 115. It will be appreciated that in other scenarios, additional devices may be present. For example, one or more devices may reside between wireless station 105 and repeater 110. Additionally, or alternatively, one or more devices may reside between repeater 110 and UE 115.

FIG. 9 is a diagram illustrating an exemplary scenario 900 in which the concepts described herein may be implemented in the downlink. In this example, wireless station 105 may transmit a resource block (RB) 905 to repeater 110. RB 905 may include reference symbols 910. For purposes of discussion, assume that a downlink grant or some other type of coordination between wireless station 105 and repeater 110 occurs before RB 905 is received.

When repeater 110 receives RB 905, for example, signal type detector 230 may determine the kind of signal that is received, as previously described. For example, repeater 110 may know that the format of the signal (e.g., OFDM). Repeater 110 may also know all of the parameters associated with this format (i.e. sub-carrier spacing, cyclic prefix length, etc.). Repeater 110 may generate the signal to be inserted in the frequency domain and then process the frequency domain signal with, for example, an Inverse Fast Fourier Transform (IFFT). Repeater 110 may add the cyclic prefix and may add in the time domain the generated insertion signal to the signal to be repeated. For example, synchronizer 235 may synchronize with RB 905 (e.g., in terms of time and frequency) so that signals may be inserted into RB 905. Signal inserter 240 may insert the signals into RB 905. In one implementation, signal inserter 240 may insert the signals into unused portions of the RB 905 based on information received from wireless station 105 (e.g., a grant). As illustrated in FIG. 9, repeater 110 may transmit a RB 915 that includes reference signals 910 and inserted signals 920 added by repeater 110. That is, repeater 110 transmits the repeated resource elements of RB 905 (including reference signals 910) and the IS 920 in RB 915.

It will be appreciated that in state of the art repeaters this is not possible since there is no way such a repeater can process, for example, individual resource elements of the OFDM signal. Also, for the LTE uplink these operations may be performed even though the LTE uplink utilizes Discrete Fourier Transform (DFT)-spread OFDM. For example, the insertion signal may be generated before a DFT spreader, but the insertion point may be in the time domain, after the DFT, IFFT, and the cyclic prefix addition.

When RB 915 is received by UE 115, UE 115 may utilize reference signals 910 from wireless station 105. Additionally, UE 115 may utilize inserted signals 920 to perform a variety of operations. For example, UE 115 may utilize inserted signals 920 to perform channel estimation, demodulation, mobility measurements, handover decisions, etc. Additionally, it will be appreciated that inserted signals 920 added by repeater 110 may not cause interference in UE 115. Further, repeater 110 may be detectable and measurable by UE 115 which may significantly improve quality of service, ability to maintain and/or establish communication links, etc., in communication system 100.

FIG. 10 is a diagram illustrating an exemplary scenario 1000 in which the concepts described herein may be implemented in the uplink. In this example, wireless station 105 may issue an uplink grant to repeater 110 and UEs 115-1 and 115-2. Based on the uplink grant. UE 115-1 may transmit a RB 1005 that includes data 1010 to repeater 110. Similarly. UE 115-2 may transmit a RB 1015 that includes data 1020 to repeater 110.

For purposes of discussion, assume that the uplink grant granted permission to repeater 110 to utilize a portion of the resources of the corresponding RB associated with the uplink grant. In this example, the portion of the RB may be allocated and/or correspond to a channel sounding reference signal (SRS) portion of the RB. As illustrated, based on the uplink grant. UE 115-1 and UE 115-2 may not transmit data within this portion of their respective RBs 1005 and 1015.

In this example, repeater 110 may add inserted signals (IS) 1030 and IS 1035 into the unused portion of a RB 1025. For example, synchronizer 235 and signal inserter 240 of repeater 110 may utilize frequency domain combs to assign IS 1030 and IS 1035 to even and odd sub-carriers within the SRS portion of RB 1025. As illustrated, repeater 110 may transmit RB 1025 that includes data 1010, data 1020, IS 1030, and IS 1035. For example, repeater 110 may combine data 1010, data 1020, ISs 1030 and 1035 as RB 1025 and forward RB 1025 to wireless station 105.

When RB 1025 is received by wireless station 105, wireless station 105 may receive data 1010 and 1020 from UEs 115-1 and 115-2. Additionally, wireless station 105 may utilize inserted signals 1030 and 1035 to perform a variety of operations. For example, wireless station 105 may utilize inserted signals 1030 and 1035 for channel estimation, demodulation, power control, etc. Additionally, it will be appreciated that inserted signals 1030 and 1035 added by repeater 110 may not cause interference in wireless station 105. That is, repeater 110 may be able to add signals that do not interfere with the data transmitted from UE 115-1 and UE 115-2 or other portions of RB 1025, and may improve the quality of service, ability to maintain and/or establish communication links, etc., in communication system 100.

FIG. 11 is a diagram illustrating an exemplary scenario 1100 in which the concepts described herein may be implemented in the uplink. In this example, however, the inserted signals may correspond to control signals (versus, for example, reference signals). Additionally, the resources granted to repeater 110 do not correspond to a SRS portion of a RB, as previously described in FIG. 10.

In this example, wireless station 105 may issue an uplink grant to repeater 110 and UEs 115-1 and 115-2. Based on the uplink grant, UE 115-1 may transmit a RB 1105 that includes data 1110 to repeater 110. Similarly, UE 115-2 may transmit a RB 1115 that includes data 1120 to repeater 110.

For purposes of discussion, assume that the uplink grant granted permission to repeater 110 to utilize a portion of the resources of a RB. For example, the portion of the RB may be allocated and/or correspond to a data portion of the RB. As illustrated, based on the uplink grant, UEs 115-1 and 115-2 may not transmit data within this portion of their respective RBs 1105 and 1115.

In this example, repeater 110 may add control signals 1130 into the unused portion of RB 1125. For example, synchronizer 235 and signal inserter 240 of repeater 110 may insert uplink control information targeted for wireless station 105. Repeater 110 may combine data 1110, data 1120, and control signals 1130 as RB 1125. Repeater 110 may transmit RB 1125 that includes data 1110, data 1120, and control signals 1130 to wireless station 105.

When RB 1125 is received by wireless station 105, wireless station 105 may receive data 1110 and 1120 from UEs 115-1 and 115-2. Additionally, wireless station 105 may utilize control signals 1130 to perform a variety of operations. For example, wireless station 105 may utilize control signals 1130 to perform a variety of operations (e.g., beamforming, power control, etc.). Furthermore, control signaling from repeater 110 to wireless station 105 may consist of measurements performed by repeater 110 (e.g. received power, etc.). Additionally, it will be appreciated that control signals 1130 added by repeater 110 do not cause interference in wireless station 105, and may improve the quality of service, ability to maintain and/or establish communication links, etc., in communication system 100.

It will be appreciated that variations to scenarios 900, 1000, and 1100 may be contemplated. For example, depending on the devices involved in communication system 100, grants may not be appropriate. For example, in the instance that wireless station 105 is communicating to a device other than UE via an intermediate device, in more general terms, some form of coordination between wireless station 105, the intermediate device, and the other device may take place. Additionally, or alternatively, in some situations, the coordination between the devices in communication system 100 may need to only take place once (i.e., in contrast to, for example, multiple grants) to allow the intermediate device to add inserted signals to transmissions received. Although not specifically mentioned in scenarios 900, 1000, and 1100, repeater 110 may insert signals in any type of channel (e.g., a control channel, a shared channel, a data channel). Further, it will be appreciated that the intermediate device may have knowledge of the kind of signals it will receive from UEs 115-1 and 115-2 on the uplink based on information received from, for example, wireless station 105.

Figure 12:
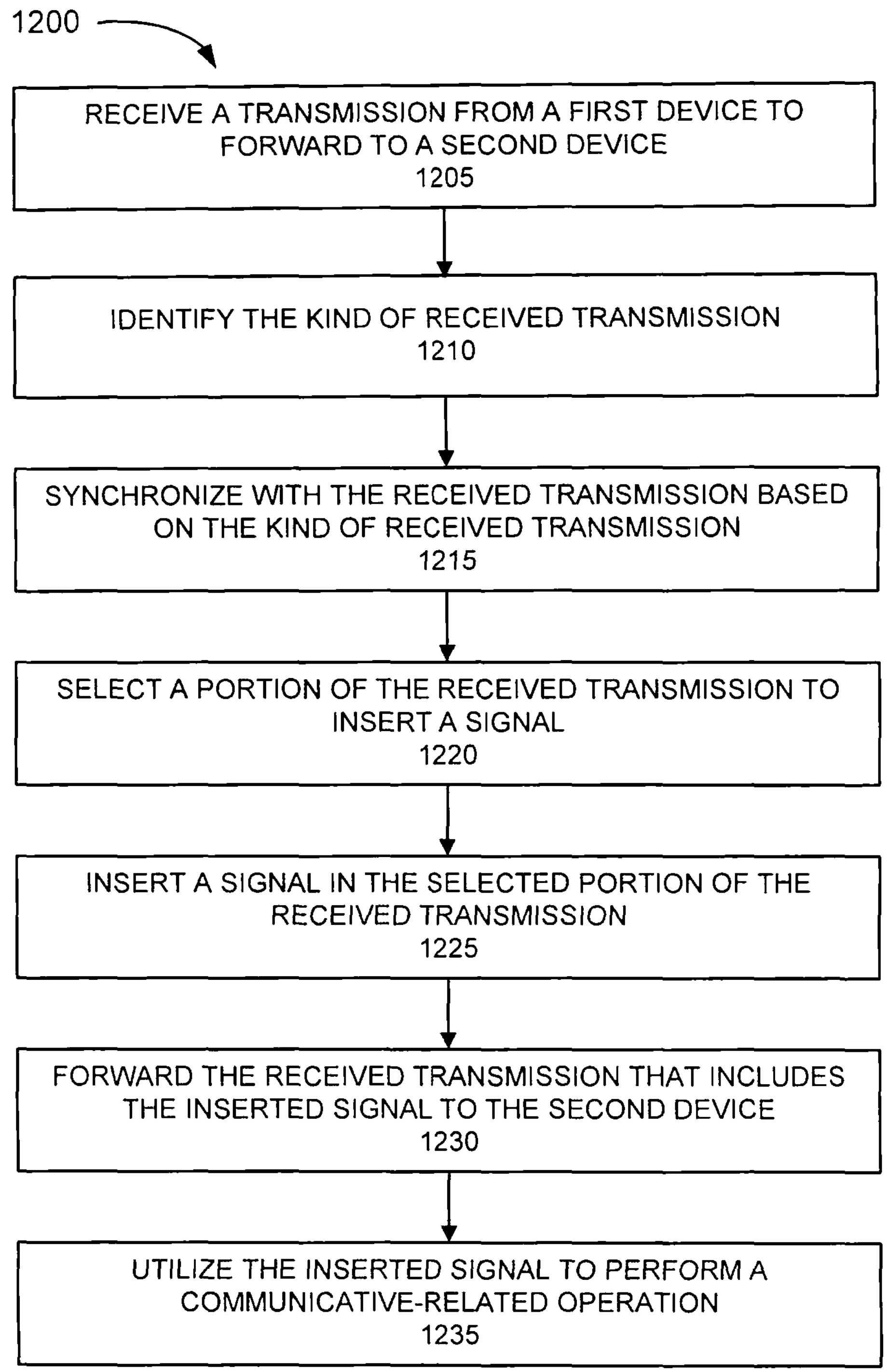
FIG. 12 is a flow diagram related to processes associated with the concepts described herein.

FIG. 12 is a flow diagram illustrating an exemplary process 1200 that may be performed by an intermediate device, such as repeater 110. Process 1200 may include operations for inserting a signal into a received signal for forwarding to other devices, such as wireless station 105 and UE 115. Although process 1200 will be described as receiving a transmission from a first device to a second device, it will be appreciated that process 1200 is applicable to receiving a transmission from the second device to the first device. Thus, the intermediate device may insert signals in either forward or reverse link directions.

Process 1200 may begin with receiving a transmission from a first device to forward to a second device (block 1205). In a multi-hop network, such as communication system 100, an intermediate device may receive a transmission from a first device to forward to a second device.

The kind of received transmission may be identified (block 1210). Signal type detector 230 may determine the kind of signal that repeater 110 receives from the first device or the second device, as previously described. For example, the kind of signal may include the format of the received signal and/or a communication standard associated with the received signal.

A synchronization with the received transmission based on the kind of received transmission may be performed (block 1215). Synchronizer 235 may synchronize with the received signal so that a signal may be inserted into the received signal. The synchronization of the received signal may include, for example, frequency and time synchronization, time synchronization, etc. Synchronizer 235 may synchronize with the received signal based on the operation of signal type detector 230.

A portion of the received transmission into which to insert a signal may be selected (block 1220). The intermediate device may select a portion of the received transmission to insert a signal. For example, the portion selected may be based on a grant received by the intermediate device or some other type of coordination with the first device and/or the second device. Additionally, the portion selected may be based on the operation of synchronizer 235 and/or signal type detector 230.

A signal may be inserted in the selected portion of the received transmission (block 1225). The intermediate device may insert a signal in the selected portion. For example, signal inserter 240 may insert the signal. The inserted signal may be added to the received transmission based on synchronizer 235 and/or signal type detector 230.

The received transmission that includes the inserted signal may be forwarded (block 1230). The intermediate device may forward the received transmission that includes the inserted signal to the second device. For example, the second device may include, for example, wireless station 105 or UE 115. In other instances, the second device may include, for example, a relay, a gateway, etc., or some other type of communication device, as previously described.

The inserted signal may be utilized to perform a communication-related operation (block 1235). Depending on the inserted signal (e.g., a control signal, a reference signal, etc.), the second device may perform various communication-related operations based on the inserted signal. For example, the second device may perform channel estimation, power control, mobility measurements and handover decisions, modulation, demodulation, beamforming and antenna steering, timing control, etc.

Although FIG. 12 illustrates an exemplary process 1200, in other implementations, fewer, additional, or different operations may be performed.

The foregoing description of implementations provides illustration, but is not intended to be exhaustive or to limit the implementations to the precise form disclosed. Modifications and variations are possible in light of the above teachings or may be acquired from practice of the teachings.

In addition, while a series of blocks has been described with regard to the process illustrated in FIG. 12, the order of the blocks may be modified in other implementations. Further, non-dependent blocks may be performed in parallel. Further one or more blocks may be omitted. It will be appreciated that one or more of the processes described herein may be implemented as a computer program. The computer program may be stored on a computer-readable medium or represented in some other type of medium (e.g., a transmission medium).

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises" or "comprising" when used in the specification is taken to specify the presence of stated features, integers, steps, or components but does not preclude the presence or addition of one or more other features, integers, steps, components, or groups thereof.

No element, act, or instruction used in the present application should be construed as critical or essential to the implementations described herein unless explicitly described as such.

The term "may" is used throughout this application and is intended to be interpreted, for example, as "having the potential to," "configured to," or "capable of," and not in a mandatory sense (e.g., as "must"). The terms "a" and "an" are intended to be interpreted to include, for example, one or more items. Where only one item is intended, the term "one" or similar language is used. Further, the phrase "based on" is intended to be interpreted to mean, for example, "based, at least in part, on," unless explicitly stated otherwise. The term "and/or" is intended to be interpreted to include any and all combinations of one or more of the associated list items.

The invention claimed is:

1. A method performed by an intermediate device in a multi-hop wireless network, comprising:
- receiving a transmission to forward to a device;
- synchronizing with the transmission based on a format of the transmission;
- selecting a resource portion of the transmission based on information included in the transmission or information previously received;
- inserting a signal in the selected resource portion of the transmission, comprising using frequency-domain combs to assign the signal to even and odd sub-carriers in the resource portion selected; and
- forwarding the transmission that includes the signal to the device;
- wherein the information previously received includes a resource grant relating to uplink resources to the intermediate device.

2. The method of claim 1, further comprising identifying the format of the transmission.

3. The method of claim 1, wherein the signal includes a reference signal or a control signal.

4. The method of claim 3, wherein the reference signal includes at least one of a cell-specific reference signal, a dedicated reference signal, a sounding reference signal, and a multimedia/multicast single frequency network reference signal.

5. The method of claim 3, wherein the control signal includes information relating to beamforming.

6. The method of claim 1, wherein the signal includes information relating to at least one of channel estimation, demodulation, power control, mobility measurement, handover, and timing control.

7. The method of claim 1, wherein the intermediate device includes a repeater.

8. The method of claim 1, wherein the intermediate device operates according to a long term evolution standard.

9. The method of claim 1, wherein the information previously received includes a coordination with another device, the coordination including information that the intermediate device uses for selecting the resource portion of the transmission.

10. An intermediate device in a multi-hop wireless network, comprising:
- at least one antenna; and
- a processing system configured to:
  - receive a transmission to forward to a device;
  - synchronize with the transmission;
  - select a portion of the transmission based on a transmission coordination that provides at least one of a format of the transmission or resources available in the transmission;
  - insert a signal in the selected portion of the transmission by at least using frequency-domain combs to assign the signal to even and odd sub-carriers in the portion selected; and
  - forward the transmission that includes the signal to the device;
  - wherein the transmission received includes a resource grant relating to uplink resources to the intermediate device.

11. The intermediate device of claim 10, wherein the transmission includes an uplink transmission or a downlink transmission.

12. The intermediate device of claim 10, wherein the device includes at least one of a base station, a base station controller, a gateway, a bridge, a router, a relay, and a switch.

13. The intermediate device of claim 10, wherein the device includes a user equipment.

14. The intermediate device of claim 10, wherein the intermediate device includes a repeater or a relay.

15. The intermediate device of claim 10, wherein the processing system is further configured to receive the transmission coordination from another device, and the transmission is received from the other device.

16. A non-transitory computer-readable medium having a stored computer program including instructions to:
- receive a transmission to forward to a communication device;
- synchronize with at least one of a frequency and a time of the transmission;
- select a resource portion of the transmission based on a format of the transmission or a transmission coordination that includes information indicating the resource portion of the transmission that is unused;
- insert a control signal or a reference signal in the selected resource portion of the transmission by at least using frequency-domain combs to assign the signal to even and odd sub-carriers in the resource portion selected; and
- initiate forwarding of the transmission that includes the control signal or the reference signal to the communication device;
- wherein the transmission received includes a resource grant relating to uplink resources.

17. The computer program of claim 16, wherein the computer program is executed by a repeater in a wireless communication system.

18. The computer program of claim 16, wherein the format of the transmission corresponds to a long term evolution format, and the transmission is received from another communication device and includes at least one reference signal or at least one control signal.

* * * * *